GATE CONTROL MEANS FOR TRAVELING PLATEN ROLLER

Filed March 22, 1967 3 Sheets-Sheet 1

United States Patent Office 3,461,799

Patented Aug. 19, 1969

3,461,799

GATE CONTROL MEANS FOR TRAVELING PLATEN ROLLER

Bryce Wilson Blair, Hershey, Pa., assignor to AMP Incorporated, Harrisburg, Pa.

Filed Mar. 22, 1967, Ser. No. 625,135
Int. Cl. B41f 3/20, 3/04
U.S. Cl. 101—269 9 Claims

ABSTRACT OF THE DISCLOSURE

A device is disclosed for reading and/or imprinting records with a plurality of modes of operation effected by an electro-mechanical control mechanism which displaces a crook shaped gate to block or pass a motor driven roller. The roller is confined within the gate at all times in that portion of the stroke which is critical to proper operation.

BACKGROUND OF THE INVENTION

In reader-imprinter devices of the type herein contemplated a motorized drive mechanism is operated to drive a linkage which displaces a reader head to read a perforated record card. Depending upon data developed from an external source based upon the information read, the device is operated to drive an imprinting roller in movement to either print a further record in several different ways or not to print the record at all. Prior to the related inventions recently disclosed and listed hereinafter, the mechanism for effecting this operation including driving and control linkages which were relatively complicated and which required frequent adjustment. One of the reasons for this is due to the use of a drive, linkage and roller confining and guiding structure which calls for an engagement of moving parts through surfaces which must be held to a close tolerance. Structures of this type are initially expensive and are seldom self-compensating for wear in use.

CROSS REFERENCE TO RELATED CASES

This case relates to applications as in Ser. No. 545,391 filed April 26, 1966 in the name of L. C. Friend; Ser. No. 618,787 filed in the name of Deckert et al.; and Ser. No. 613,022 filed in the name of Blair et al., now Patent No. 3,402,662.

SUMMARY OF THE INVENTION

This invention relates to a reader/imprinter device which is operable in several distinct modes to print or not print a record inserted therein. Operation is responsive to electric control signals supplied to the device after a first reading of a further record inserted therein. It is an object of the invention to provide a reader/imprinter having a gate mechanism for controlling roller movement in selected paths to print or not print, which mechanism is simpler and more reliable than heretofore available. It is a further object to provide a reader and roller drive linkage in conjunction with a stroke controlling gate mechanism which substantially reduces the necessity for critical spacing of parts and close tolerances. It is another object of the invention to provide a mechanism having an imprinting roller driven in a standard stroke but controlled to operate in a printing or non-printing positions by a gate which confines the roller at all times during that portion of the stroke which is critical to proper operation of the device. It is still another object of the invention to provide an imprinting mechanism having a motor driven roller and roller stroke controlling gate which is substantially tamper proof to thwart efforts to circumvent record reading as a condition precedent to imprinting.

The foregoing objects are attained in a reader/imprinter device which includes a motorized drive having an identical movement in different modes of device operation. The drive is connected to a linkage which is supported with the portions thereof engaging the drive and the resulting movement thereof being identical for different modes of device operation. Forward portions of the linkage carrying the imprinting roller of the device are loosely confined in both a vertical and horizontal sense. Confinement is provided by a fixed guide structure which leads to a movable gate operable in two different positions to effect two different modes of operation. The gate is crook shaped so as to receive the roller for engagement with the projecting ends of the shaft thereof confined within the crook. The gate is movable into two different positions to permit or block printing action of the roller and the gate is arranged to be controlled from a point removed from any opening in the device housing which would permit false operation of the device.

COMPONENT DESCRIPTION

Figures 1, 4:
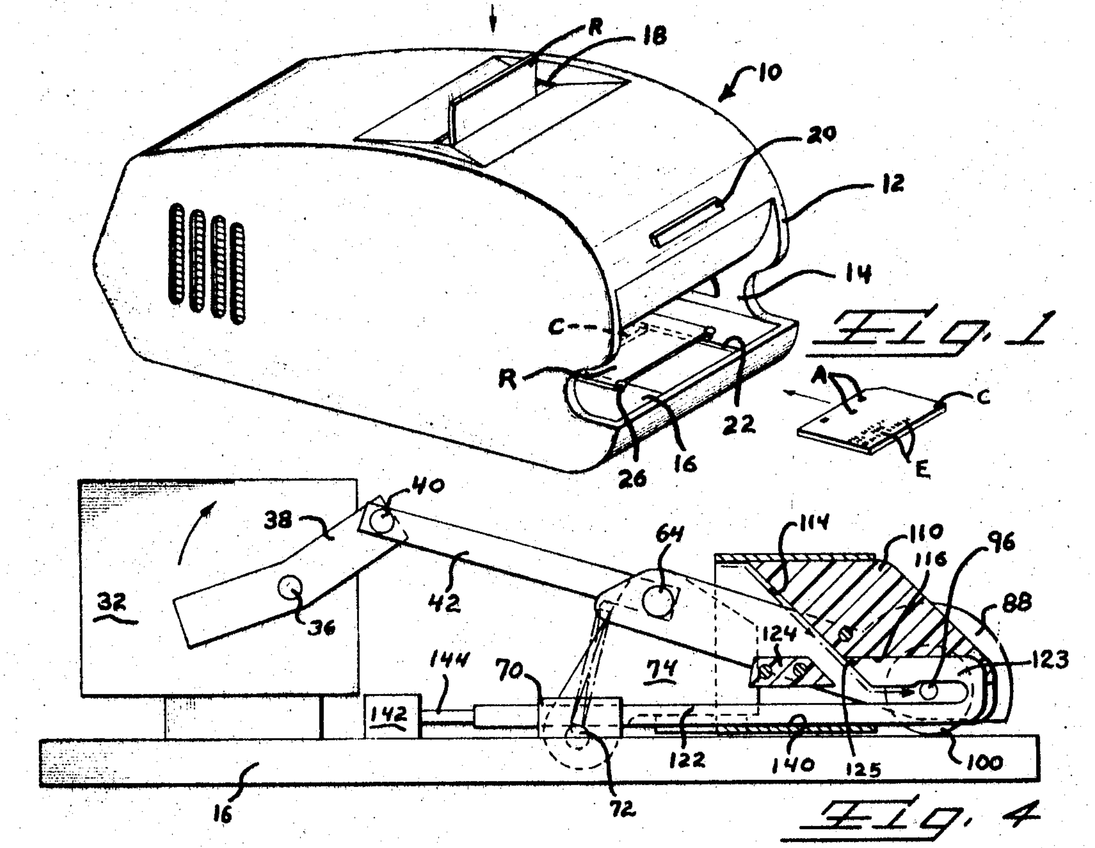
FIGURE 1 is a perspective view of a reader/imprinter embodiment in accordance with the invention.
FIGURES 4, 5 and 6 are side views of the mechanism of FIGURE 2 in different positions during operation.

FIGURE 1 shows a reader-imprinter assembly 10 having records C and R inserted therein with an additional record C shown to the right of the assembly. The relative size of the assembly 10 can be appreciated from the size of the credit card C. It is contemplated that an assembly 10 would be used at any station wherein record entries are required. Typical uses would be in department stores at various cash register locations or at entries and exits to a building or facility wherein security checks are required.

Figures 2, 7, 8, 9:
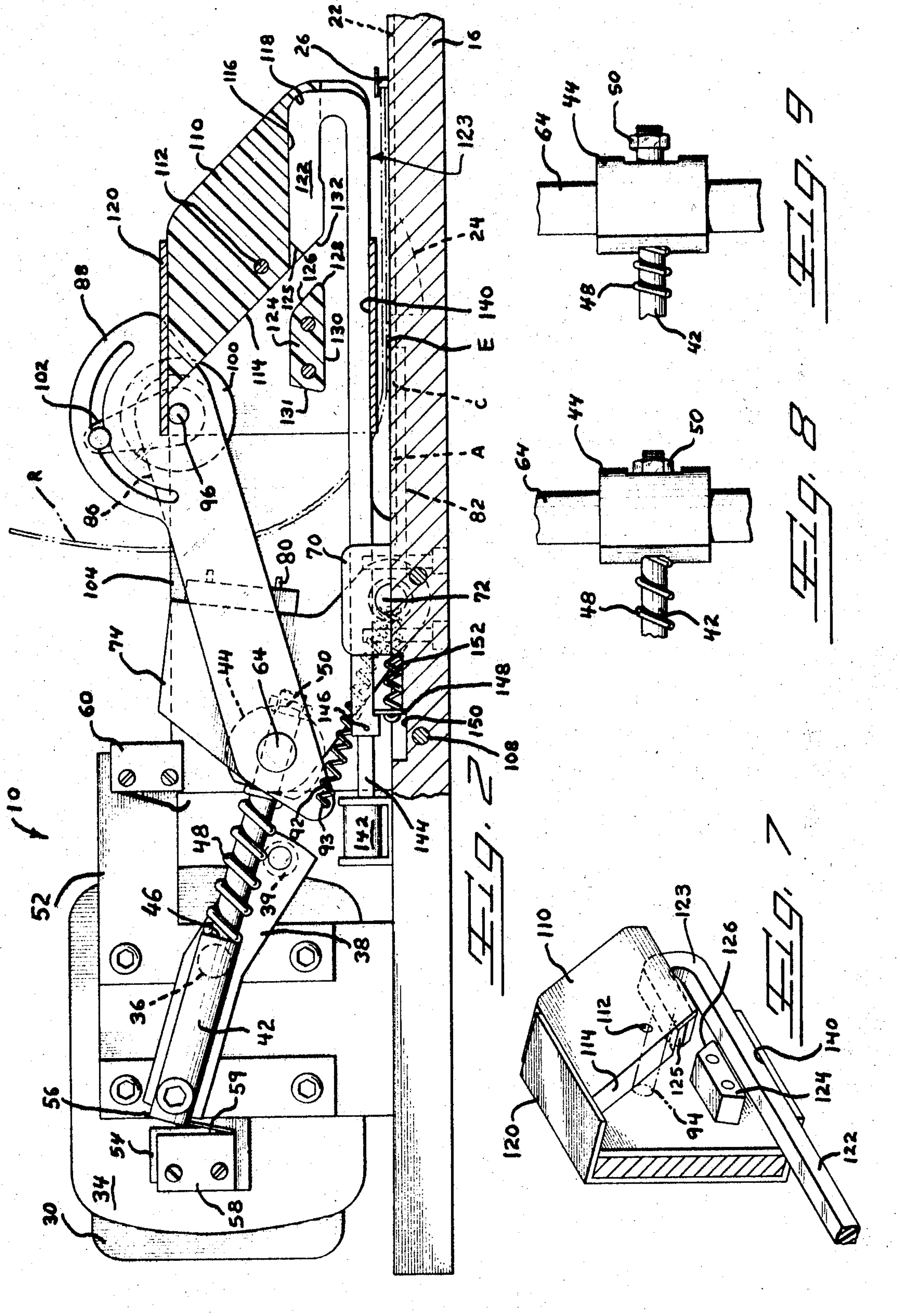
FIGURE 2 is a side view in partial section showing the drive, linkage, reader and roller mechanism of the invention relative to an imprinting and reading platen having records disposed thereon.
FIGURE 7 is a perspective of a portion of a gate mechanism of the invention.
FIGURES 8 and 9 are plan views of a drive connection to the linkage mechanism of the invention.
Figure 3:
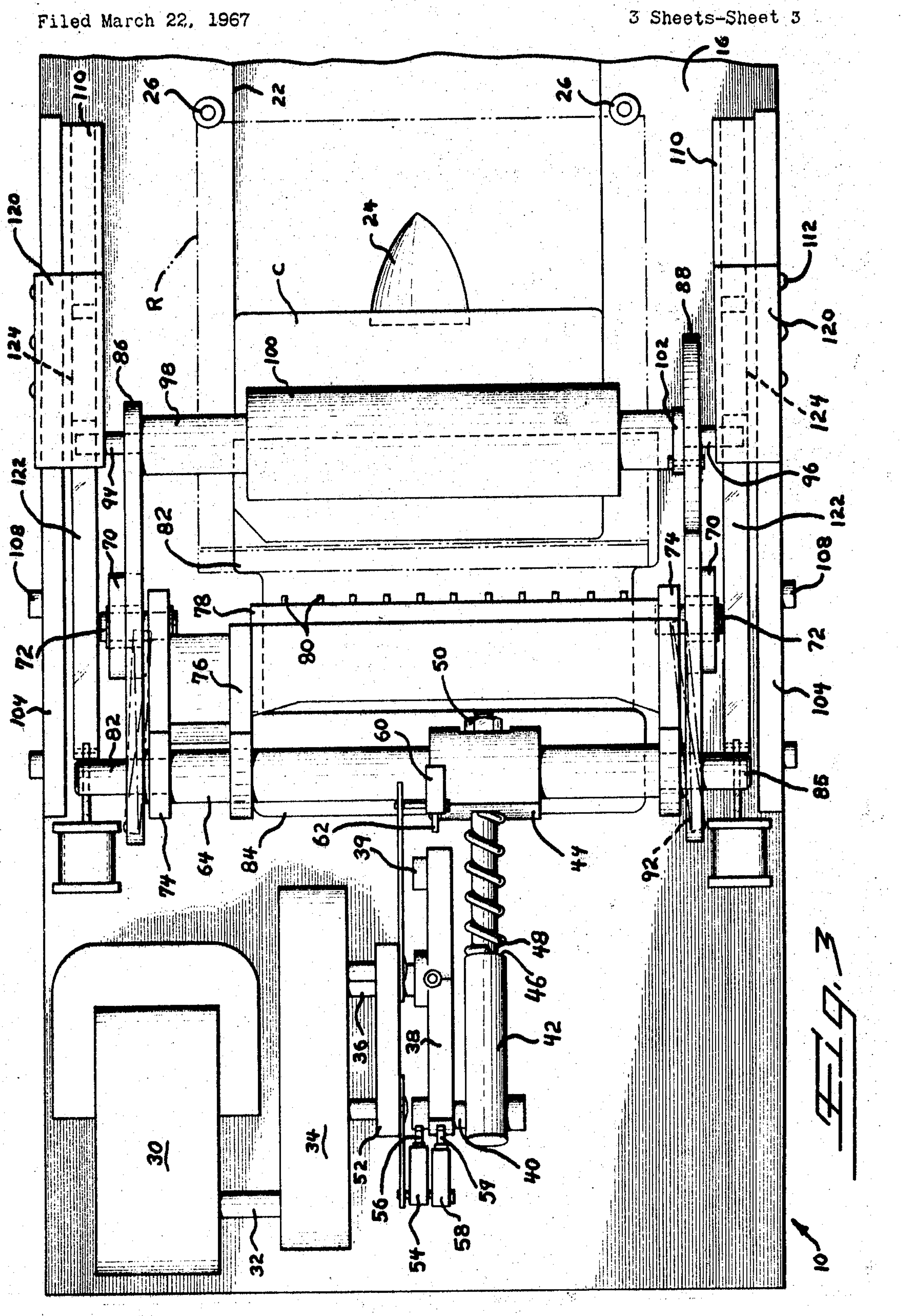
FIGURE 3 is a plan view showing the structure of FIGURE 2.

The assembly 10 includes an outer housing 12 which has a record receiving slot or opening 14 at one end which exposes a base platen 16 of the unit and permits the insertion of a credit card C therewithin. A further opening 18 is provided at the top of the unit to facilitate insertion of a further record R. An operating button 20 is shown above the opening 14 and it is this button which initiates a reading/imprinting cycle. The surface of platen 16 near the opening 14 and extending back within the unit, as shown in FIGURE 1, is relieved as at 22 to receive the body of the credit card as it is inserted. As shown in FIGURES 2 and 3 there is a recess in 16 shown as 24 which facilitates removal of the credit card C. FIGURE 1 shows a pair of stops defined by posts 26 extending up from the surface of 16 to catch the end of the record R. Means not shown may be provided to guide the record R into a position with one end abutting the stops 26 and with the other end extending out of the slot 18. The record R overcovers the card C and, as shown in FIGURE 2, overlies the surface thereof as well as an adjacent surface of 16.

The credit card C is typically comprised of a plastic sheet having apertures A therein as shown in FIGURE 1 which are positioned to form a code identifying the card holder. The card also includes a raised embossment E which also identifies the card owner in some language or code. The record R is typically comprised of a number of sheets of paper prepared to print copies under the force of a roller driven to bear thereagainst and against the embossment of the card C.

In use card C is first required to be placed in position within the assembly 10 and then the record R inserted within slot 18 into the position shown in FIGURES 1 and 2. Thereafter, depression of the button 20 causes the unit to cycle and to operate in one of several modes, depending upon the credit or other status of the owner of the card. As will be described in detail hereinafter, the assembly 10 includes a motorized drive which causes a reader head to read the apertures A in the card C and develop electrical signals. These signals are then transmitted from the remote position of the assembly 10 to a central computer or other center of data storage. There some comparison of the incoming signals is made and, dependent thereon, a signal (or signals) is sent back to the remote station to control the mode of operation of the assembly. Leads supplying power to the assembly 10 and leads, not shown, carrying the signals to and from the assembly would be included. Reference may be made to the above identified applications and particularly to the application to Deckert et al. for a preferred arrangement of signal leads.

Referring now to FIGURES 2 and 3, the mechanism of the assembly is shown in an initial or rest position prior to the beginning of an operating cycle and following positioning of the records R and C. The platen 16 serves as a base for the mechanism. To the left in FIGURES 2 and 3 is the drive for the unit including a motor 30 secured to the top of the base. The motor 30 is provided with an output shaft 32 to a gear box 34 also secured to the base. An output shaft 36 from gear box 34 is connected to a driving arm 38 which carries in one end a shaft 40 pivotally linked to a driving link 42. Energization of the motor 30 operates through the gear box 34 and shaft 36 to rotate arm 38 and the end of link 42 which is connected to 40. The other end of link 42 is connected through a sleeve 44 to the main driving shaft of the unit, shown as 64 in FIGURES 2 and 3. Link 42 and shaft 64 are made to reciprocate from left to right to left in a cycle of operation.

The sleeve 44 is secured to 64 but both include apertures arranged to slidingly receive the right end of link 42 extended therethrough. A compression spring 48 is mounted on link 42 in a position to bear against sleeve 44 and an offset shown as 46 in the outer surface of link 42. The spring 48 tends to push link 42 away from link 44 and shaft 64. The right end of link 42 (viewing FIGURES 2 and 3) is held against leftward displacement relative to 44 by a nut 50 secured on threading on the end of link 42. The force of spring 48 is adjusted so that during drive to the right link 42 will be displaced slightly relative to 44 and 64 as shown in FIGURE 9. During return movement to the left the nut 50 will operate as shown in FIGURE 8 to provide a direct connection between link 42, sleeve 44 and shaft 64. This driving connection has been found to substantially compensate for linkage wear during use of the assembly and also to greatly facilitate initial assembly by eliminating problems with close fitting tolerances of mating parts.

Of perhaps greater importance, the use of a spring to develop outdrive prevents overloading the driven mechanism including particularly the reader head. As will be described hereinafter in detail, the reader head is driven down into an engagement with conductive pads in the surface of 16 through the apertures A of the card C to accomplish card reading. FIGURE 4 shows the reader head (mostly in phantom in this view) in position under drive of link 42 and shaft 64. With the mechanism of the invention this engagement is supplied by spring pressure (spring 48) and not by a direct and positive drive through element bearing surfaces which may vary in dimension. It has been found that the use of a spring drive for the driven parts, in fact, reduces wear as well as improving reliability by eliminating damage to the reader head and the other driven elements of the drive mechanism from initial misalignment or from misalignment occurring during during use caused by wear.

Mounted on the side of the gear box 34 is a switch frame 52 shown in FIGURES 2 and 3 carrying three micro-switches shown as 54, 58 and 60. These micro-switches are positioned to be engaged by the arm 38 or the shaft 40 during rotary movement and during an operating cycle. The switch 54 including a projecting switch arm 56 is positioned to be actuated to close upon first movement of arm 38 by an engagement with a portion of shaft 40 projecting through arm 38 as shown in FIGURE 3. First movement is caused by energization of motor 30 through a switch (not shown) controlled by the pushbutton 20. As the arm 38 rotates to drive the linkage to the right and into the position shown in FIGURE 4 with the reader head in full engagement to read the card C, an end of 38 carrying a pin 39 is brought around to engage 56. This will cause switch 54 to open the power supply to motor 30 and stop the mechanism. The arm 38 is as shown in FIGURE 2 made in a relatively wide V shape to provide a proper timing of the operation of the switches 54 and 60 when mounted as shown in FIGURE 2.

After the card has been read and a signal developed at the central station which will control the mode of operation in return movement and determine whether or not an imprinting will take place, the motor 30 is again energized so that 38 rotates back to the initial position. The shaft 40 will again engage switch 54 opening the circuit and stopping the cycle with the mechanism in the initial position shown in FIGURE 2. During the cycle as 38 rotates the end thereof shown in engagement with the contact arm 59 of switch 58 engages the contact arm 62 of switch 60 at a point in time when the mechanism is in the position of FIGURE 4 and the reader head is fully engaged. The switch 60 is closed to provide an output indicating that the reader head is properly closed. This is used to develop a signal for gating purposes to cause the circuit paths to the assembly to be energized and thereby develop signals generated by the reader head which are transmitted to the central station. Upon first movement of 38 the switch 58 is closed by an engagement of the end of 38 with the arm 59 to turn on an indicator light, not shown, which may be externally positioned on the unit. This indicator light will remain on until the cycle of operation is completed and 38 returns to the initial position to operate 58 and open the circuit to the indicator light.

Turning now to the driven mechanism and to FIGURES 2 and 3 there is included mounted on the top of base 16 toward the center thereof a pair of pillow blocks 70 each including an axle 72 supported by bearings for rotary movement. Each axle is connected to a plate shown as 74 through which is fitted the shaft 64. Mounted between the plate 74 shown toward the bottom of FIGURE 3 and a further plate shown as 76 in FIGURE 3 is a reader head shown as 78. The reader head 78 includes a series of contact spring members projecting therefrom and shown as 80. When the drive shaft 64 is actuated to effect a movement of the mechanism to the right the reader head 78 is pivoted from the position shown in FIGURE 2 about the axle 72 down into the position shown in FIGURE 4. This forces the contact springs 80 in engagement with the credit card C which is aligned relative to such engagement so that the contact springs 80 project through the apertures thereof to engage a printed circuit shown as 82 in FIGURE 2. The printed circuit contains conductive pads isolated from each other but connected through printed circuit paths to an edge connector shown as 84 in FIGURE 3 carrying input and output leads not shown. The various contact springs 80 are bused together in patterns so that engagement with a printed circuit path will develop electrical signals through the leads in the edge connector which are in turn connected by cable to a central station. As previously described the reader head is driven down into the position shown in FIGURE 4 under a spring force provided by spring 48 controlled so as to preclude damage of the head due to the engagement. As also previously described the reader head is left in the position of engagement shown in FIGURE 4 for a period of time sufficient to permit card reading and the return of control signals which determine the mode of operation following reading. The mechanism of the invention is arranged so that a reading must take place before imprinting of the embossment E of the card C. The switches are arranged so that the mechanism is disabled until the reading operation is completed.

The shaft 64 includes projecting ends shown as 82 and 85 in FIGURE 3. A pair of arms shown as 86 and 88 in FIGURE 3 are pivotally connected to the ends of shaft 64 to project forwardly therefrom in a position overlying the card C and record R. The arms 86 and 88 are biased upwardly away from card C and record R by a tension spring shown as 92 in FIGURE 2 anchored at one end to the base 16 and tied at the other end as at 93 to a projecting portion of the plates. Operation of the spring 92 can be visualized from FIGURES 4–6.

The plates 86 and 88 are apertured to receive the ends 94 and 96 of a shaft 98 carrying the imprinting roller of the mechanism shown as 100. The plate 88 includes an adjustment mechanism shown generally as 102 which permits an adjustment of the roller 100 relative to its position in the plates and relative to its position in biasing surfaces to be described hereinafter. This adjustment mechanism is described in greater detail in the above mentioned application to Deckert et al.

As can be discerned from FIGURES 2 and 4–6, the roller 100, as carried by the plates, is relatively free in a vertical sense between confining surfaces spaced widely apart. Movement of the roller from left to right to left under drive from link 42 and shaft 64 can also be visualized from FIGURES 2 and 4–6.

On each side of the platen 16 as shown in FIGURE 3 are upstanding walls shown as 104 and 106 secured to the base 16 as by bolts or rivets shown as 108 relative to wall 106. Each of the walls includes a plastic guide block shown as 110 in FIGURE 2 rigidly secured thereon as by a rivet or a bolt 112 to project inwardly of the wall and above the upper surface of the platen 16. Each block includes a first sloping surface 114, a horizontal surface 116 and a stop surface 118. Attached to each block is a V-shaped bracket member such as 120 better shown relative to block 110 in FIGURE 7. The top of the member 120 projects back to the left to confine the roller in a vertical sense by an engagement with the shaft ends 94 and 96. The bottom of the bracket serves as a gate support.

Figure 5:
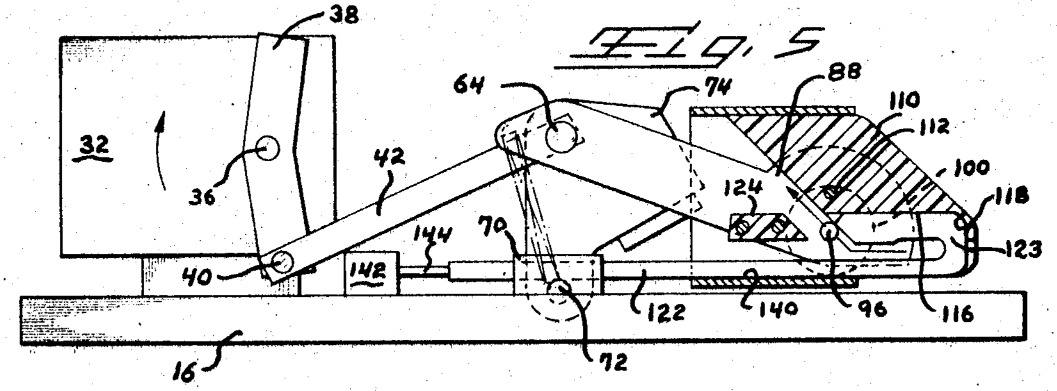
Figure 6:
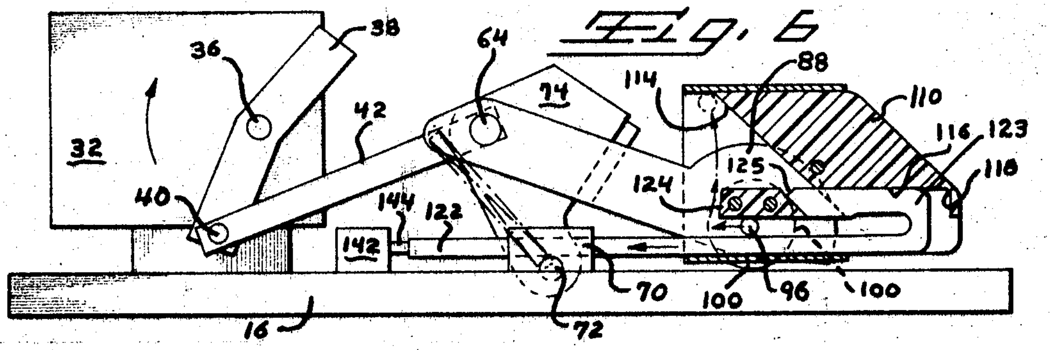

The tapered surface 114 of each block serves to guide the roller in a downward and forward movement by an engagement with the shaft ends 94 and 96. The surface 116 operates to position and guide a slidable gate member shown as 122 in FIGURE 2. The surface 118 operates as a forward stop for the gate member 122. FIGURES 4 and 5 show the travel of the roller 100 resulting from the engagement of the shaft thereof with the surface 114 of the block. The gate member has a generally crook shaped end 123 having a beveled portion 125 which serves to receive the shaft ends 94 and 96 and drive the gate to the the right in the event that the gate restoring mechanism does not operate. Projecting inwardly from each side wall is a further block member shown as 124 rigidly fixed to the wall and in a position to provide a guiding surface for the roller in return movement. Each block includes (as shown in FIGURE 2) a sloped leading surface 126 rounded at the lower end as at 128, a horizontal lower surface 130 and a generally vertical rear surface 132. The surface 126 has a slope which matches an end surface shown as 132 of the gate 122. When the gate member 122 is positioned to the left the surfaces 126 and 132 mate as shown in FIGURE 6. The surface 130 is spaced upwardly relative to the upper surface of base 16 in a position to receive the ends 94 and 96 and bias the roller downwardly against the record R and the embossment E of card C to effect a printing of the record R. After printing the roller shaft passes behind surface 131 and vertically upward to the position shown in FIGURE 2, as indicated in FIGURE 6. In a preferred construction the blocks 110 and 124 are made of a plastic material such as Delrin. This material has been found to minimize wear to the shaft ends 94 and 96.

The metal bracket 120 which defines the upper position of the roller includes a lower flange shown in FIGURE 2 as 140 extending inwardly of each wall to support the gate member 122. FIGURE 7 shows the bracket in perspective. The gate member 122 is thus supported for sliding movement by the surface 116 of block 110 and the upper surface of 140. The left end of 122 as is shown in FIGURE 2 connected to a solenoid shown as 142, the solenoid arm being shown as 144 pinned to the end of 122 as at 146. The solenoid 142 is anchored to the base 16 and is operable when energized to pull the arm 142 and the gate member 122 to the left. The stroke of the solenoid is made to approximately coincide with the spacing between surfaces 132 of the gate member and the surface 126 of the block 124. Connected to the gate member at a point proximate the connection to the solenoid arm is a projecting member shown as 148 the end of which rides in a slot 150 within the base 16. Member 148 is connected to a tension spring shown as 152 tied or anchored to the base at a point near axle 72. The spring 152 tends to bias the gate forwardly at all times into the position shown in FIGURE 2. The spring is just strong enough to accomplish this purpose so as to not unduly load the solenoid 142. As shown in FIGURE 3 the gate solenoid combination is repeated on each side of the assembly and this redundancy considerably reduces the likelihood of false or spurious operation. Both solenoids and both gate members are required to be operated at an exact time in the cycle of operation to enable the printing of the record R to take place.

The different modes of operation possible with the assembly as thus described are revealed in FIGURES 4–6. In each mode, energization of the drive causes a first reading of the card C with the roller traversing the dotted and arrowed path shown in FIGURE 4. The ends of the shaft of roller 100 are positioned within the crook 123 of the gate member 122 (the right end in FIGURE 2) and are trapped therein against vertical movement. If the solenoids 142 are not energized by reason of failure of a signal sent thereto from the central accounting station the gate members 122 will remain in the position shown in FIGURE 4 and the return movement of the drive will cause the roller to traverse the path shown in FIGURE 5 back up to the initial position without effecting a printing of the embossment of the card C. This operation also serves to prevent a printing in the event of an improper reading the card or failure in communication with the central station. Responsive to a signal from the central station and a following energization of the solenoids 142 the gate members 122 will be pulled back to the position shown in FIGURE 6 to cause the roller to traverse the imprinting surface of R positioned over embossment E of C to effect an imprinting of record R. The lower surface 130 of block 124 is accordingly positioned to engage the shaft ends 94 and 96 and develop sufficient pressure for printing. The arrowed line in FIGURE 6 shows the return path of the roller to the initial position. The interior surface of the crook 123 of the gate member 122 (the right end in FIGURE 2) is relatively wide and deep as compared with the diameter of the ends of the shaft 94 and 96 and the movement within the gate member. This eliminates any problem of tolerance with respect to the interior gate member surface since the shaft rides on the top surface of the crook at all times due to the loading by springs 92.

Having now described the invention in an embodiment intended to enable a preferred mode of practice thereof, the invention will be defined by the appended claims.

What is claimed is:

1. In an apparatus for use with information bearing records, a printing platen and means to receive and position records on the surface thereof, imprinting means including a roller and a roller drive operable to cause roller movement in an outward and backward stroke along and over said platen, first guide means affixed to said platen and positioned to engage said roller during said outward stroke to guide said roller downwardly toward said platen during said movement, second guide means operatively associated with said roller and spaced from said first guide means and gate means including interior surfaces adapted to receive and entrap portions of said roller therewithin toward the end of the said outward movement, a gate drive means operable to position a portion of said gate means against said second guide means to cause said roller to engage said second guide means and to be biased thereby into an imprinting engagement with said record and said platen.

2. The apparatus of claim 1 including spring means operable to bias said gate means into a position precluding engagement of said roller with said second guide means to preclude an imprinting operation in the absence of operation of said gate drive means.

3. The apparatus of claim 1 wherein said roller has projecting end portions and said gate means is comprised of a pair of members disposed on each side of said platen and slidably mounted for movement parallel to the movement of said roller relative to said platen, each of said members having a forward crook shaped portion with the inner surface thereof positioned to receive said end portions of said roller during outward movement of said roller near the end of the outward stroke thereof.

4. The apparatus of claim 1 including walls upstanding from said platen on each side thereof and said first and second guide means are comprised of block members secured to said walls to project over said platen and the said roller includes a shaft having end portions engaged by the surfaces of said first and second guide means during the outward and backward portions of movement.

5. The apparatus of claim 4 wherein said gate means is positioned to receive the end portions of said shaft during the end of said outward movement and during the beginning of the return movement.

6. The apparatus of claim 5 wherein said gate means is slidable within a portion of said first guide means in positions wherein said surfaces of said gate means correspond with portions of said first guide means to provide an even and aligned support of said shaft end portions during travel of said roller.

7. The apparatus of claim 1 wherein the first mentioned drive for said roller includes a driving arm and a driving link slidably connected thereto, a spring member positioned on said driving link to spring load the connection between said arm and said link to limit the driving force applied to drive said roller in outward movement to in turn limit the force applied to said guide means by said roller.

8. The apparatus of claim 7 including means providing a positive engagement between said arm and said link with said linkage during drive of said roller in return movement.

9. The apparatus of claim 8 wherein there is provided a reader head pivotally secured to said platen in a position to be engaged by said roller drive and forced into an engagement with a record on said platen in the outward movement of said roller and means are provided to withdraw said head from such engagement responsive to the return movement of said roller under said roller drive.

References Cited

UNITED STATES PATENTS

| | | | |
|---|---|---|---|
| 1,385,788 | 7/1921 | Kirshner | 101—306 |
| 2,994,265 | 8/1961 | Hurlbut et al. | 101—269 |
| 3,003,415 | 10/1961 | Herbert | 101—269 |
| 3,018,725 | 1/1962 | Maul et al. | 101—269 |
| 3,048,097 | 8/1962 | Miller | 101—306 X |
| 3,179,046 | 4/1965 | Maul et al. | 101—269 |
| 3,253,541 | 5/1966 | Goodrich | 101—269 |
| 3,272,120 | 9/1966 | Johnson | 101—56 |

WILLIAM B. PENN, Primary Examiner

U.S. Cl. X.R.

101—285, 306